O. T. BAKER.
Car-Coupling.
No. 162,336.
Patented April 20, 1875.
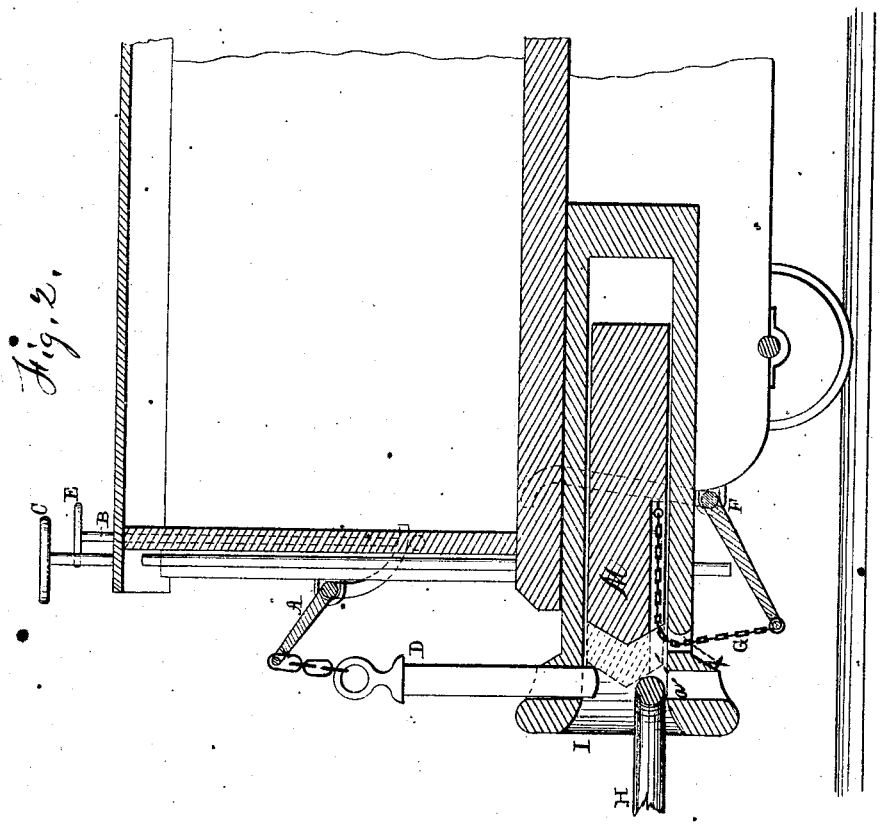
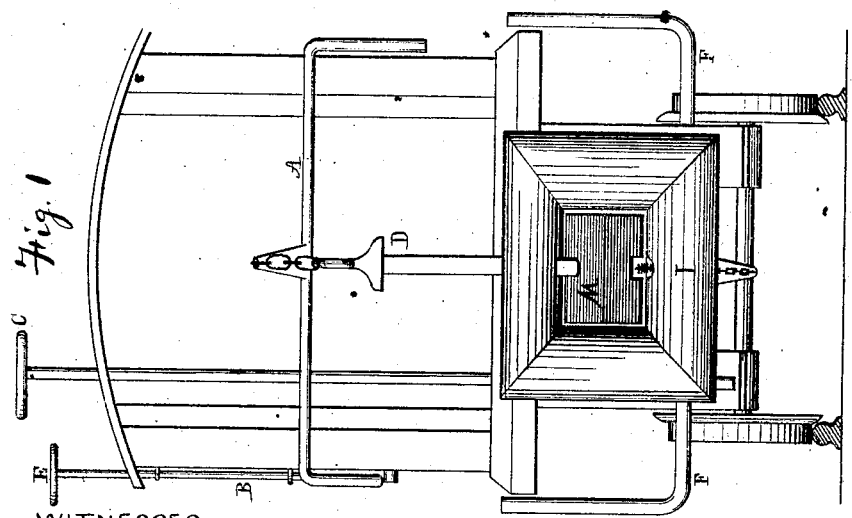
WITNESSES:
Joseph Perry Hook
Simeon Dearin
INVENTOR:
Owen T. Baker
THE GRAPHIC CO.PHOTO-LITH.39 & 41 PARK PLACE,N.Y.

UNITED STATES PATENT OFFICE.

OWEN T. BAKER, OF WAMEGO, KANSAS, ASSIGNOR OF ONE-HALF HIS RIGHT TO OSCAR M. GAY, OF SAME PLACE.

IMPROVEMENT IN CAR-COUPLINGS.

Specification forming part of Letters Patent No. 162,336, dated April 20, 1875; application filed March 11, 1875.

*To all whom it may concern:*

Be it known that I, OWEN T. BAKER, of Wamego, Pottawatomie county, State of Kansas, have invented an Improvement in Railroad-Car Couplers, of which the following is a specification:

The object of my invention is to facilitate the coupling and uncoupling of railroad-cars with a saving of time and labor, and without danger to life or limb; and it consists in the combination of a lever, which is attached by a chain or its equivalent passing through a hole in the bottom of the coupler, with a follower within the bumper, for the purpose of drawing the follower into a position under the pin, to support it when elevated, and also to hold in the desired position the coupling-link, as more fully hereinafter set forth.

Figure 1 represents an end view, and Fig. 2 a horizontal section.

Within the draw-head I is placed a sliding bar or follower, M, having a beveled front, as shown. This follower has a groove, $a$, in its bottom, at the end, to which is attached a chain or rope, G, which passes through an opening, $x$, in the bottom of the draw-head, and is connected to the crank-lever F, one arm extending up outside of the car, as shown.

To couple the cars, prepare the coupler by depressing either end of the lever A, which may be done by hand, or by using the treadle B to raise the pin D; then, with the lever F, bring forward the follower E to support the pin D. The link H, attached to another car, on being thrust into the throat of the coupler, causes the follower E to recede, when the pin D will fall through the link H and the hole I in the bottom of the coupler, and make a certain and secure couple.

The coupler, to which the link is attached before the coupling is made, is prepared by placing the link H in the desired position, and holding it there by throwing the follower E against it with the lever F, continuing the pressure until the couple is completed.

To uncouple cars, either when standing still or in motion, depress either end of the lever A with the hand, if standing on the ground, or by pressing down the treadle B if on top of the car, thus raising the pin D, and allowing the cars to be separated.

It will be understood that the lever A and apparatus for operating the same may be dispensed with whenever so desired, and that the coupler described can be used with any form of railroad-cars.

By having the opening $x$ in the bottom of the draw-head, it cannot become filled up with dirt, snow, ice, &c., which would prevent the follower from being readily moved out and in.

I am aware that a draw-head having a slide therein which is moved by a chain passing through an opening in the top of the same, and said chain connecting directly with a coupling-pin, is not new.

What I claim is—

The combination of the draw-head I, having an opening, $x$, in its under side, the follower M, having the bottom groove $a$, and chain G, the crank-lever F, extending up the side of the car, and the pin D, all substantially as set forth.

OWEN T. BAKER.

Witnesses:
 JOSEPH PERRY HOOK,
 SIMEON DEARIN.